United States Patent [19]
Stravitz

[11] Patent Number: 6,082,553
[45] Date of Patent: *Jul. 4, 2000

[54] STEPPED ORGANIZER/RACK

[76] Inventor: David M. Stravitz, 16 Park Ave., Suite 14A, New York, N.Y. 10016

[*] Notice: This patent issued on a continued prosecution application filed under 37 CFR 1.53(d), and is subject to the twenty year patent term provisions of 35 U.S.C. 154(a)(2).

[21] Appl. No.: 08/961,171

[22] Filed: Oct. 30, 1997

Related U.S. Application Data

[60] Provisional application No. 60/030,993, Nov. 13, 1996.

[51] Int. Cl.$^7$ .................................................. A47B 63/00
[52] U.S. Cl. ...................... 211/40; 211/41.12; 206/308.1; 312/9.9
[58] Field of Search ..................... 211/40, 41.12, 211/43, 41.3, 70.6, 11, 55; 312/9.9, 348.3, 9.54; 206/308.1, 387.14; D6/407

[56] References Cited

U.S. PATENT DOCUMENTS

| | | | |
|---|---|---|---|
| D. 217,633 | 5/1970 | Iorio | D7/99 |
| D. 231,178 | 4/1974 | Wright | D6/407 |
| D. 242,890 | 1/1977 | Hillman et al. | D6/186 |
| D. 243,042 | 1/1977 | Dorn | D6/407 X |
| D. 250,434 | 11/1978 | Ekeland | D6/407 X |
| D. 260,455 | 9/1981 | Haswell | D3/35 |
| D. 374,582 | 10/1996 | Chu | D6/516 |
| D. 387,840 | 12/1997 | Duggan | D6/407 |
| 600,879 | 3/1898 | Louden | 211/11 X |
| 1,008,124 | 11/1911 | Dudley | 211/40 X |
| 1,453,065 | 4/1923 | Fargo . | |
| 1,455,524 | 5/1923 | Fargo . | |
| 1,470,159 | 10/1923 | Gibson | 211/55 X |
| 1,672,633 | 6/1928 | Vogel | 211/55 |
| 1,699,025 | 1/1929 | Schulz | 211/55 X |
| 1,857,305 | 5/1932 | Holliday | 211/55 X |
| 1,917,005 | 7/1933 | Anderson et al. | 211/55 X |
| 2,751,088 | 6/1956 | Hargett | 211/55 |
| 3,623,615 | 11/1971 | Kawachi | 211/40 |
| 3,786,927 | 1/1974 | Manheim | 211/40 X |
| 4,484,538 | 11/1984 | Sarkozy et al. | 118/729 |
| 4,611,720 | 9/1986 | Staab | 211/60.1 |
| 4,684,027 | 8/1987 | Wright | 211/40 |
| 4,723,662 | 2/1988 | Johnson | 211/40 |
| 4,765,469 | 8/1988 | Seifert | 211/40 |
| 4,796,761 | 1/1989 | Hermelin | 211/11 |
| 4,832,208 | 5/1989 | Finnegan | 211/73 |
| 4,944,412 | 7/1990 | Daigre | 211/11 |
| 4,967,915 | 11/1990 | Robson | 211/40 |
| 5,178,284 | 1/1993 | Wojewoda | 211/40 |
| 5,215,198 | 6/1993 | Sutton | 211/40 |
| 5,289,925 | 3/1994 | Newmark | 211/40 |
| 5,297,675 | 3/1994 | Martucci | 206/387.14 X |
| 5,415,298 | 5/1995 | Callahan et al. | 211/40 |

FOREIGN PATENT DOCUMENTS

| | | | |
|---|---|---|---|
| 2223218 | 4/1990 | United Kingdom | 211/41.12 |

Primary Examiner—Daniel P. Stodola
Assistant Examiner—Khoa Tran
Attorney, Agent, or Firm—Frishauf, Holtz, Goodman, Langer & Chick, P.C.

[57] ABSTRACT

A stepped-type organizer for use with compact disks or other articles, includes a first L-shaped section having a first rectangular plate connected at a substantially 90° angle to a second rectangular plate at a first corner line; and a second L-shaped section having a third rectangular plate connected at a substantially 90° angle to a fourth rectangular plate at a second corner line; all of the plates having equal widths, and the first plate having a first length, the third plate having a lesser length than the first length and the second and fourth plates having even lesser lengths. One edge of the first plate is connected to one edge of the third plate at a raised third corner line, so as to provide a zig-zag arrangement, with the stepped-type organizer being supportable on a surface by the first and second corner lines. First and second raised outboard retaining walls are provided at opposite sides of the organizer; and a plurality of parallel, spaced apart shallow ribs are formed on an upper surface of the organizer, to retain objects in standing relation between adjacent ones of the ribs.

12 Claims, 6 Drawing Sheets

STEPPED ORGANIZER/RACK

This application claims benefit of Provisional Appl. 60/030,993 filed Nov. 13, 1996.

BACKGROUND OF THE INVENTION

The present invention relates to a stepped-type organizer or rack for compact disks, audio tapes, and other media recording/playback devices and other articles which are storable on a rack or the like, and more particularly, is directed to such an organizer having good stability, good operability, and good storage efficiency, and which is easily manufactured.

Throughout the following specification, the invention will be described with reference to "compact disk". However, as should be clear from the foregoing, the invention encompasses storage of audio tapes, video tapes, DAT, other recording media such as other recording tapes or devices, and is even applicable to books, boxes or any other devices which are conveniently stored in a rack or book case. The use of the term "compact disk" throughout the following specification is not limiting of the present inventive concept, and the term "compact disk" is used for convenience in the following.

Compact disk organizers are well known. Generally, compact disks are stored in drawers or in racks. When stored in drawers, the disks are not readily viewable and accessible. Racks, on the other hand, provide ready viewing and accessibility. However, racks generally occupy a large area, since a separate slot is provided for each compact disk. Further, the compact disks are not always easily removable from the racks, for example, by a simple finger push or pull.

OBJECTS AND SUMMARY OF THE INVENTION

Accordingly, it is an object of the present invention to provide a stepped-type organizer that overcomes the aforementioned problems.

It is another object of the present invention to provide an organizer which provides easy viewing of the compact disks or other articles stored therein.

It is still another object of the present invention to provide an organizer that permits easy access to the compact disks or other articles stored therein.

It is a yet further object of the invention to provide an organizer that has great balance and stability, even when only a few articles are held therein.

In accordance with an aspect of the present invention, an organizer includes a first L-shaped section having a first plate connected at an angle to a second plate at a first corner line; a second L-shaped section having a third plate connected at an angle to a fourth plate at a second corner line; one edge of the first plate being connected to one edge of the third plate at a raised third corner line, so as to provide a zig-zag arrangement, with the organizer being supportable on a surface by the first and second corner lines.

Each of the first through fourth plates has a substantially rectangular configuration, with the first through fourth plates having equal widths. The first plate has a first length and the third plate has a length less than the length of the first plate, whereas the second and fourth plates have lengths less than the length of the third plate. The second and fourth plates have substantially equal lengths.

The first and second plates are connected at a substantially 90° angle, and the third and fourth plates are connected at a substantially 90° angle, whereas the first and third plates are connected at a substantially 90° angle.

A first raised outboard retaining wall is provided at one side of the organizer and connected with the first through fourth plates so as to extend above upper surfaces thereof, and a second raised outboard retaining wall is provided at an opposite side of the organizer and connected with the first through fourth plates so as to extend above the upper surfaces thereof.

In one embodiment, a third raised retaining wall is formed on an upper surface of the organizer between the first and second raised outboard retaining walls.

In another embodiment, a plurality of parallel, spaced apart shallow ribs are formed on an upper surface of the organizer, to retain objects in standing relation between adjacent ones of the ribs. The shallow ribs are formed on upper surfaces of all of the first through fourth plates.

In accordance with another aspect of the present invention, an organizer includes a first L-shaped section having a first plate connected at an angle to a second plate at a first corner line; a second L-shaped section having a third plate connected at an angle to a fourth plate at a second corner line; a third L-shaped section having a fifth plate connected at an angle to a sixth plate at a third corner line; one edge of the first plate being connected to one edge of the sixth plate at a raised fourth corner line, and one edge of the third plate being connected to one edge of the fifth plate at a raised fifth corner line, so as to provide a zig-zag arrangement, with the organizer being supportable on a surface by the first through third corner lines.

Each of the first through sixth plates has a substantially rectangular configuration, and the first through sixth plates have equal widths. The first and fifth plates have a first length and the third and sixth plates have a length less than the length of the first and fifth plates. The second and fourth plates have lengths less than the length of the third plate. Further, the second and fourth plates have substantially equal lengths.

The first and second plates are connected at a substantially 90° angle, the third and fourth plates are connected at a substantially 90° angle, and the fifth and sixth plates are connected at a substantially 90° angle. Further, the first and sixth plates are connected at a substantially 90° angle, and the third and fifth plates are connected at a substantially 90° angle.

A first raised outboard retaining wall is provided at one side of the organizer and connected with the first through sixth plates so as to extend above upper surfaces thereof, and a second raised outboard retaining wall is provided at an opposite side of the organizer and connected with the first through sixth plates so as to extend above the upper surfaces thereof.

A plurality of parallel, spaced apart shallow ribs are formed on an upper surface of the organizer, to retain an object in standing relation between adjacent ones of the ribs. The shallow ribs are formed on upper surfaces of all of the first through sixth plates.

The above and other objects, features and advantages of the invention will become readily apparent from the following detailed description thereof which is to be read in connection with the accompanying drawings. As mentioned above, the following description is given for a compact disk organizer, it being understood that the invention encompasses use with other articles or objects, usually of a predetermined regular size, such as audio tapes, video tapes, DAT, other media products, books, cased computer disks, etc.

DETAILED DESCRIPTION OF THE PREFERRED EMBODIMENTS

Figure 1:
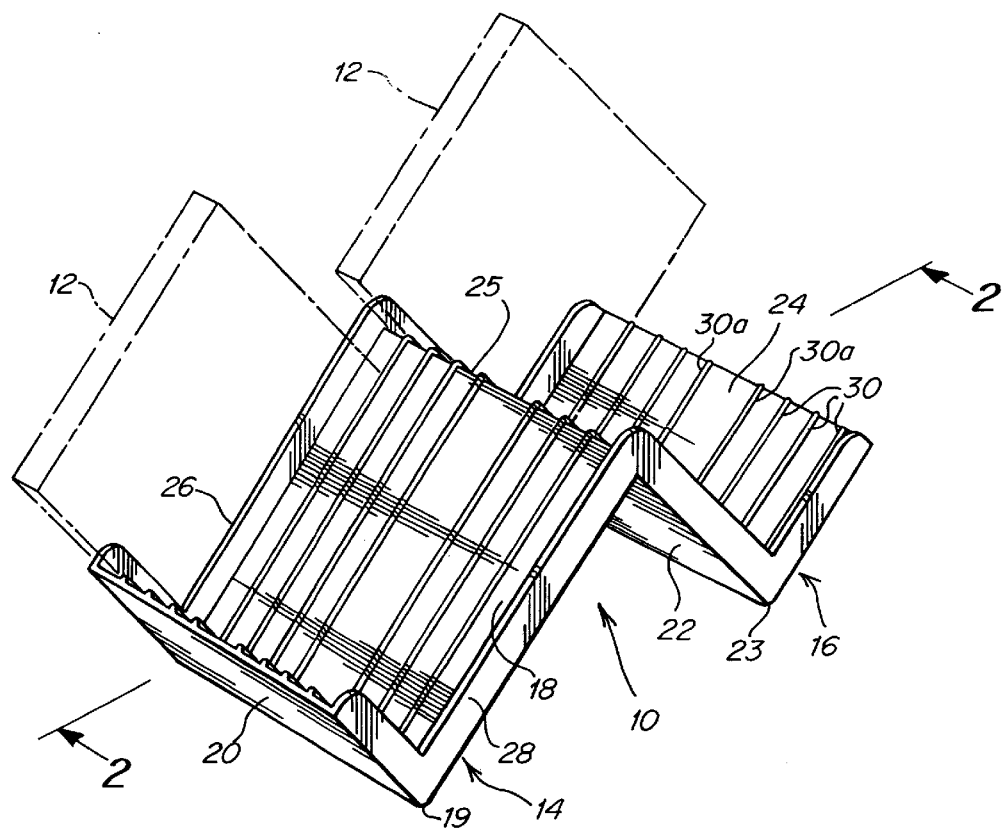
FIG. 1 is a perspective view of a compact disk stepped-type organizer according to a first embodiment of the present invention, showing two compact disks therein in phantom.

Referring to the drawings in detail, and initially to FIGS. 1–5 thereof, there is shown a stepped-type compact disk organizer 10 according to a first embodiment of the present invention, with two compact disks 12 therein, shown in phantom.

Organizer 10 includes a first reversed L-shaped section 14 connected to a second L-shaped section 16. Specifically, first reversed L-shaped section 14 includes a first large rectangular plate 18 having a width and a length, and connected at a corner line 19 with a second small rectangular plate 20 having the same width but a smaller length, for example, approximately one-half of the length of large rectangular plate 18. Preferably, the length of small rectangular plate 20 is one-half the length of a compact disk case. For example, for a compact disk case having a length of 5½ inches, the length of small rectangular plate 20 would be 2¾ inches. The front edge of large rectangular plate 18 is connected at corner line 19 with the rear edge of small rectangular plate 20 at a substantially 90° angle.

In like manner, second L-shaped section 16 includes a third large rectangular plate 22 having the same width and a length which falls between the lengths of large rectangular plate 18 and a fourth small rectangular plate 20, and connected at a corner line 23 with a small rectangular plate 24 having the same width and a smaller length similar to that of small rectangular plate 20. The rear edge of large rectangular plate 22 is connected at corner line 23 with the front edge of small rectangular plate 24 at a substantially 90° angle.

Figure 2:
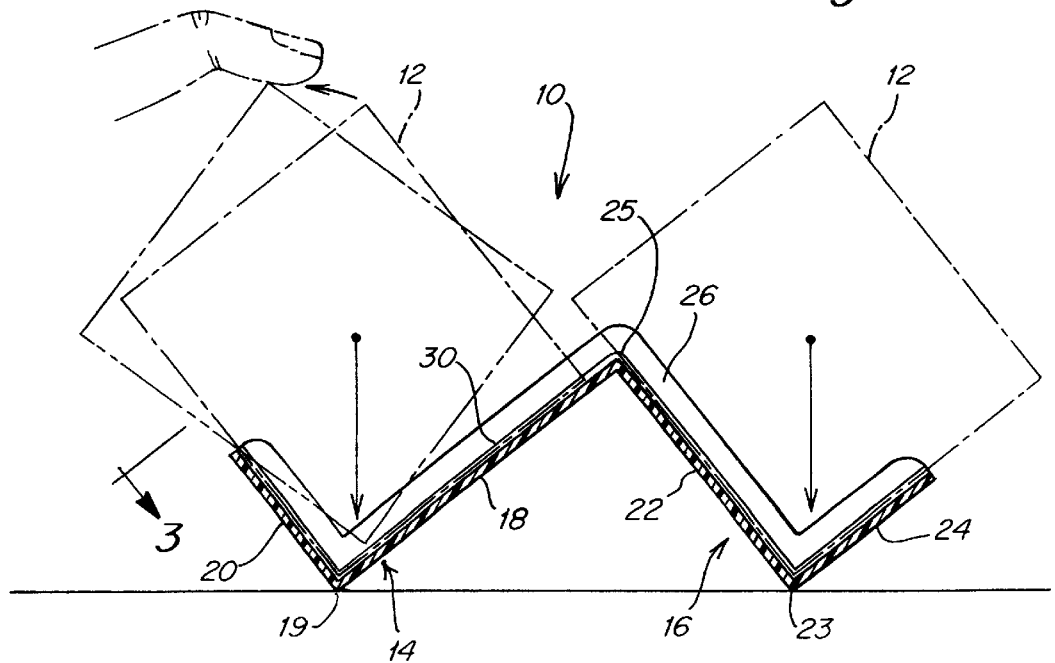
FIG. 2 is a cross-sectional view of the compact disk organizer of FIG. 1, taken along line 2—2 thereof.

Further, the front edge of large rectangular plate 22 of second section 16 is connected at a substantially 90° angle to the rear edge of large rectangular plate 18 of first section 14 at a raised corner line 25. As a result, organizer has a zig-zag configuration, as shown in FIGS. 1 and 2. With this arrangement, organizer 10 is supported on a flat surface only by corner lines 19 and 23, as shown in FIG. 2. The lengths of shorter rectangular plates 20 and 24 will depend on the angle of inclination thereof relative to the horizontal. Specifically, the greater the angle of inclination relative to the horizontal, the shorter the lengths thereof can be made.

It will be appreciated that the above angles and dimensions relate to the preferred embodiment of the present invention, but that any other suitable angles and dimensions can be used.

First and second raised outboard retaining walls 26 and 28 are connected at opposite side edges of organizer 10 and, thereby extend along opposite sides of plates 18, 20, 22 and 24, in order to prevent compact disks 12 from falling out from the sides of organizer 10. Preferably, retaining walls 26 and 28 have a height of ⅜ inch from the upper surface of organizer 10, although the present invention is not limited to this height.

In addition, a plurality of parallel, spaced apart, shorter ribs 30 extend along the upper surface of organizer 10, that is, along the upper surfaces of plates 18, 20, 22 and 24 so as to extend in a zig-zag manner thereon. Preferably, ribs 30 have a height of 0.065 inch from the upper surface of organizer 10, although the present invention is not limited to this height. Ribs 30 function to hold compact disks 12 in a neat and straight standing relation.

Figure 3:
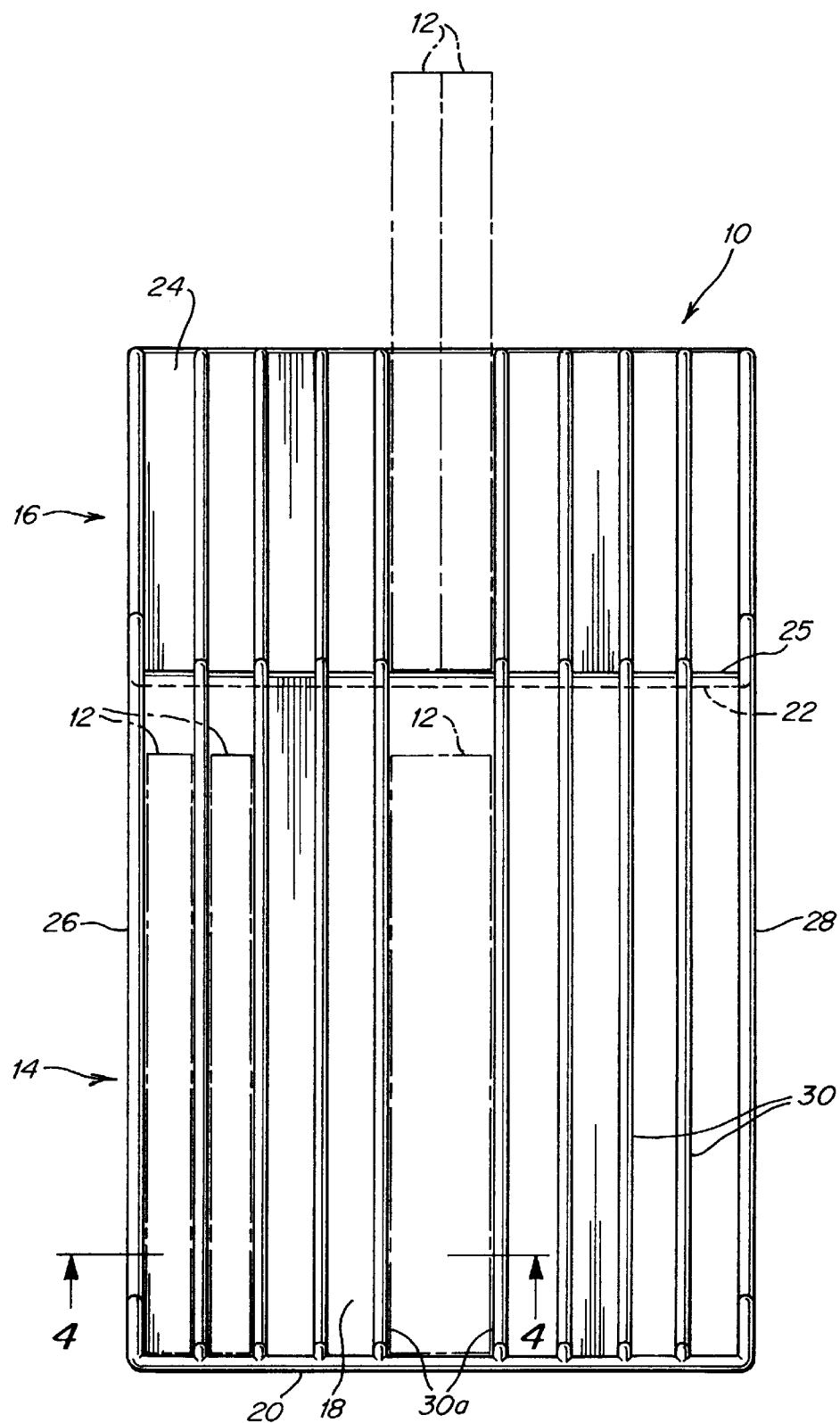
FIG. 3 is a top plan view of the compact disk organizer of FIG. 2, viewed along line 3—3 thereof.

Preferably, the spacing between ribs 30 is slightly larger than the width of a compact disk case, for example, leaving a clearance of about 0.0175 inch on each side of the compact disk case, that is, a total clearance of 0.035 inch. However, the present invention is not limited to this spacing. For example, it is preferable that at least two ribs 30a have a double spacing therebetween to accommodate a double size or two album compact disk, as shown in FIGS. 1, 3 and 4.

Figure 4:
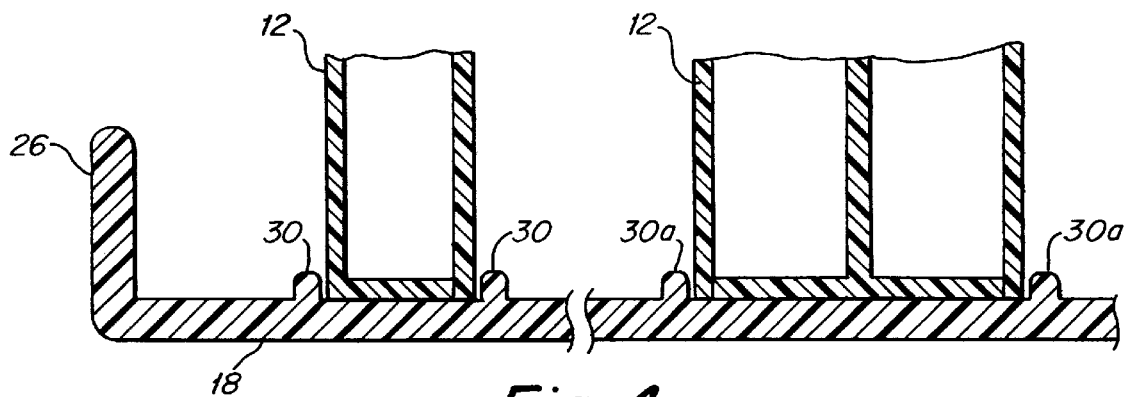
FIG. 4 is a cross-sectional view of the compact disk organizer of FIG. 3, taken along line 4—4 thereof.
Figure 5:
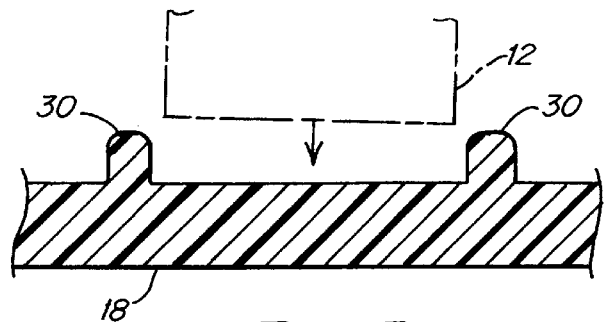
FIG. 5 is an enlarged cross-sectional view of a portion of the compact disk organizer of FIG. 4, showing one slot thereof.
Figure 6:
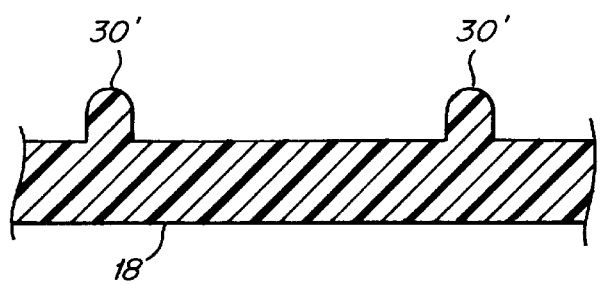
FIG. 6 is an enlarged cross-sectional view similar to FIG. 5, showing a first modification thereof.
Figure 7:
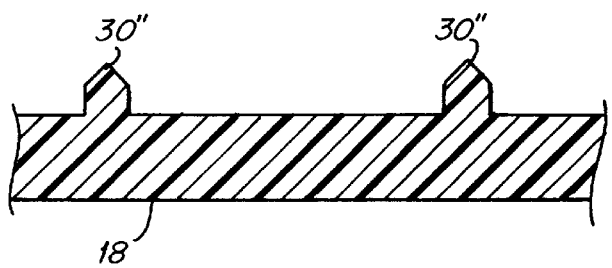
FIG. 7 is an enlarged cross-sectional view similar to FIG. 5, showing a second modification thereof.

Preferably, ribs 30 have a substantially rectangular cross-sectional configuration, with rounded upper side edges, as shown in FIGS. 4 and 5. However, ribs 30' can be totally rounded in cross-section at their upper ends, as shown in FIG. 6, or ribs 30" can have a triangular upper end in cross-section, as shown in FIG. 7. The rounded or inclined edges of the upper end of each rib 30, 30' and 30" provides a lead-in for easier insertion of compact disks. This is particularly helpful when organizer 10 is full except for one slot, and where it is not easy to view the ribs.

With the above arrangement, a plurality of compact disks 12 can be stored on end in sections 14 and 16, and are separated by ribs 30. As shown in FIGS. 1 and 2, compact disks 12 have lengths greater than the lengths of shorter rectangular plates 20 and 24 so as to extend therefrom.

It will be appreciated that organizer 10 is well balanced so that only a few compact disks on one section 14 or 16 will counterbalance a whole row of compact disks on the other section 16 or 14.

Preferably, as shown in FIGS. 1 and 2, compact disks 12 in first section 14 do not extend to the upper end of longer rectangular plate 18 thereof. However, because of the shorter nature of longer rectangular plate 22 of section 16, compact disks 12 extend past the upper end thereof. This results in compact disks 12 in section 16 extending in overhanging relation above compact disks 12 of section 14.

Since compact disks 12 are pitched, the titles thereof are easily viewable. To remove a compact disk 12 from either section 14 or 16, a single finger can be used to merely rock the compact disk out of the respective section 14 or 16, as shown in FIG. 2. During such rocking movement, the compact disks rock primarily on the free edges of shorter rectangular plates 20 and 24. Because of the respective heights of longer rectangular sections 18 and 22 relative to that of the compact disks held therein, removal of a compact disk 12 from section 14 will not be hindered by the overhanging compact disks 12 held in section 16. It will be appreciated that the shorter the rectangular plate 20, the less headroom is necessary with respect to the overhanging compact disks 12 in order to remove the compact disks 12 from first section 14.

Although the present invention has been described primarily for use with compact disks, it will be appreciated that any other suitable object can be held therein, for example, books, audio and video cassettes, and the like. In such case, the only change would be in the relative dimensions, that is, the spacing between the ribs and the length and width of the respective rectangular plates. For this reason, reference to box-like articles in the claims is intended to cover compact disks, books, audio and video cassettes, and the like.

Figure 8:
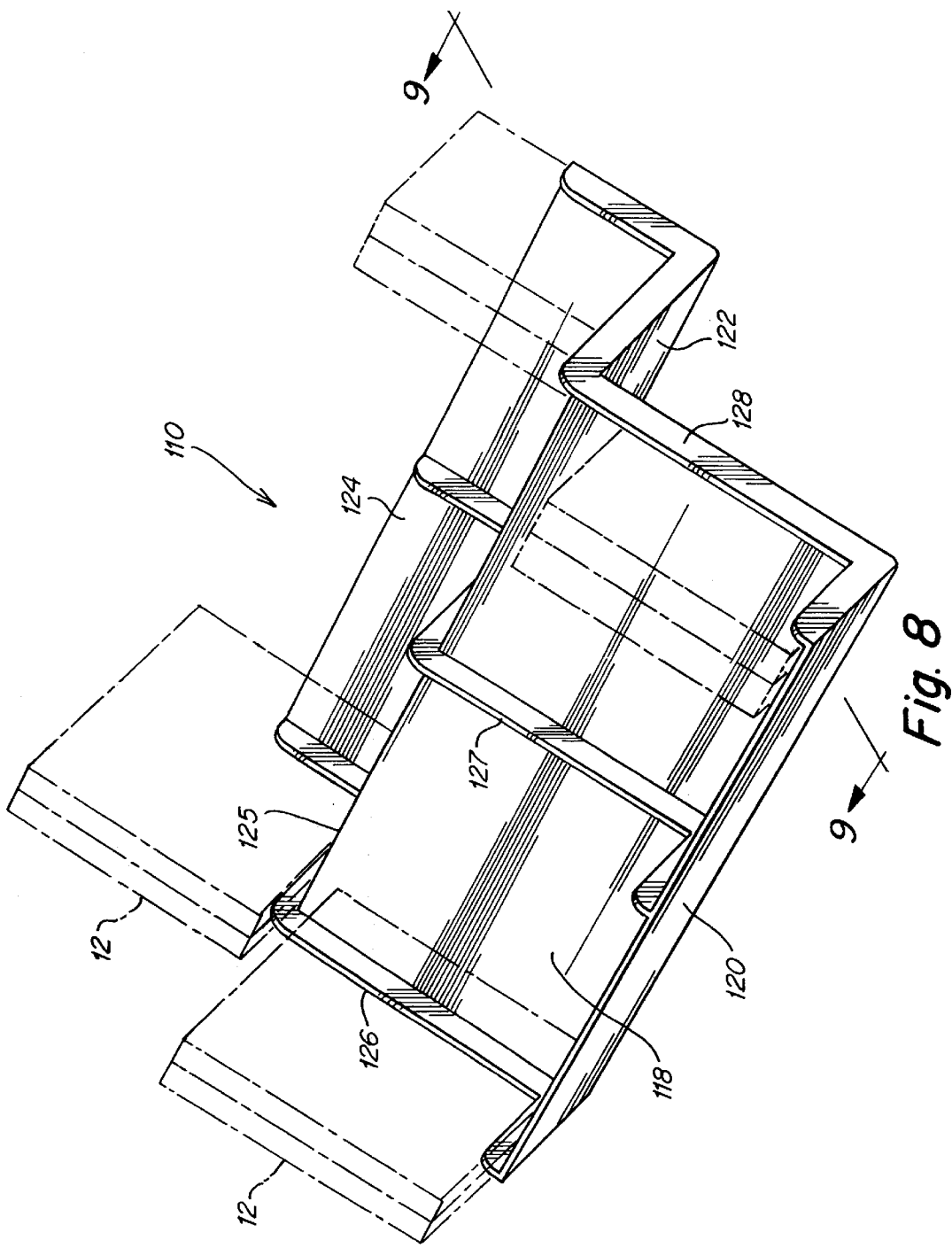
FIG. 8 is a perspective view of a compact disk organizer according to a second embodiment of the present invention, showing compact disks therein in phantom.
Figure 9:
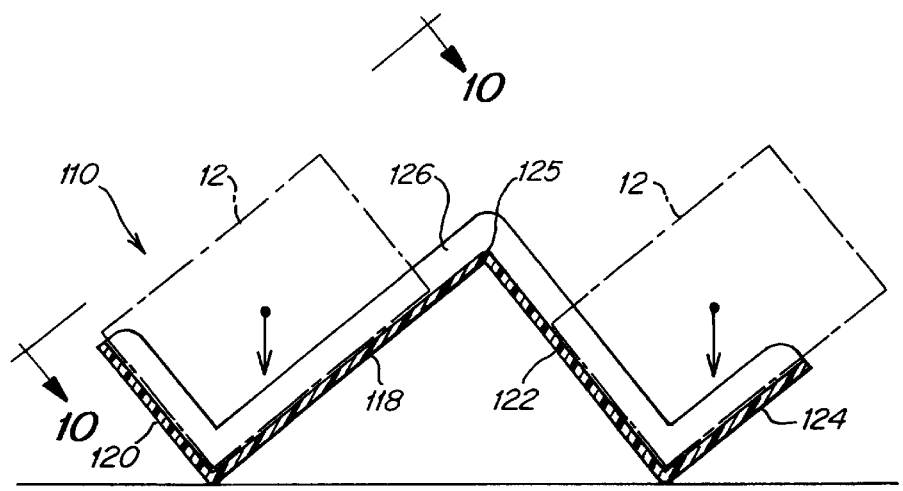
FIG. 9 is a cross-sectional view of the compact disk organizer of FIG. 8, taken along line 9—9 thereof.
Figure 10:
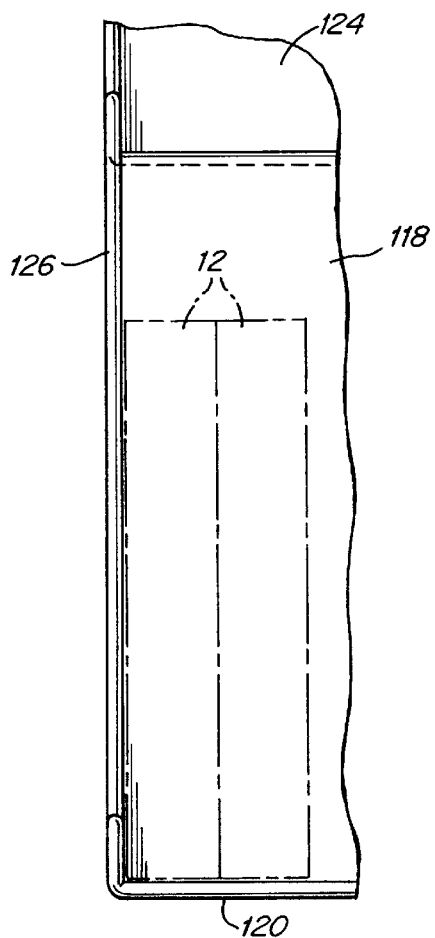
FIG. 10 is a cross-sectional view of a portion of the compact disk organizer of FIG. 9, taken along line 10—10 thereof.

Referring now to FIGS. 8–10, a stepped-type organizer 110 according to another embodiment of the present invention will now be described in which elements corresponding to those of compact disk organizer 10 of FIGS. 1–7 are identified by the same reference numerals, augmented by 100, and a detailed description of the common elements will be omitted for the sake of brevity.

Thus, stepped-type organizer 110 is formed from rectangular plates 118, 120, 122 and 124 in the same manner as the corresponding rectangular plates of compact disk organizer 10.

The organizer 110 differs from compact disk organizer 10 in the following respects. First, the width of organizer 110 is approximately twice the width of organizer 10 in order to store a greater number of compact disks 12 or other articles thereon. Further, ribs 30 are eliminated entirely so that articles of different widths (sizes) can be conveniently and securely stored thereon. Lastly, a central zig-zag retaining wall 127 is formed on the upper surface of organizer 110, midway between end retaining walls 126 and 128 and of the same height. Thus, a plurality of compact disks 12 or other articles are stacked in abutting relation between retaining walls 126 and 127, and a different plurality of compact disks 12 or other articles are stacked in abutting relation between retaining walls 127 and 128.

Figure 11:
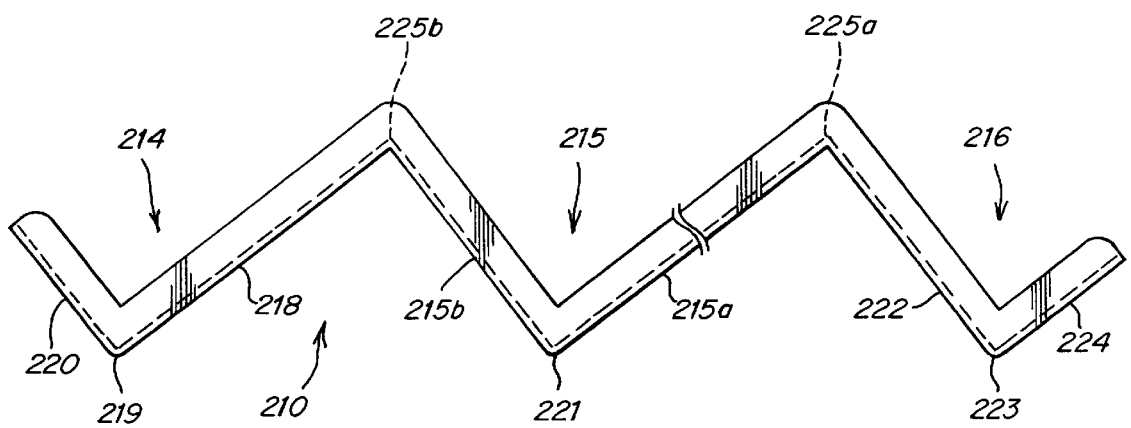
FIG. 11 is a side elevational view of a compact disk organizer according to a third embodiment of the present invention.

Referring now to FIG. 11, a stepped-type compact disk organizer 210 according to another embodiment of the present invention will now be described in which elements corresponding to those of compact disk organizer 10 of FIGS. 1–7 are identified by the same reference numerals, augmented by 200, and a detailed description of the common elements will be omitted for the sake of brevity.

Compact disk organizer 210 provides a third section 215 which is interposed between and connected first section 214 and second section 216. Third section 215 has a reverse L-shape configuration, with a fifth large rectangular plate 215a having the same width as the other first through fourth plates 218, 220, 222 and 224 and a length equal to the length of large rectangular plate 218 of first section 214, and connected at a substantially 90° angle at a corner line 221 with a smaller sixth rectangular plate 215b having the same width and a length equal to the length of large rectangular plate 222 of second section 216. The rear edge of large rectangular plate 215a is connected with the front edge of large rectangular plate 222 of second section 216 at a raised corner line 225a at a substantially 90° angle. Further, the front edge of smaller rectangular plate 215b is connected at a raised corner line 225b at a substantially 90° angle to the rear edge of large rectangular plate 218 of first section 214. As a result, organizer has a larger zig-zag configuration than the aforementioned embodiments. With this arrangement, organizer 210 is supported on a flat surface only by corner lines 219, 221 and 223, as shown in FIG. 11.

The rocking movement for removal of the compact disks or other articles occurs in the same manner with the first and second section 214 and 216. As to second section 215, the rocking movement occurs at the front edge of smaller rectangular plate 215b. In such case, because of the overhanging clearance, there is sufficient room to rock the compact disk or other articles a small amount and then pull it out.

Of course, although not shown, it will be appreciated that the organizer 210 can be provided with ribs similar to ribs 30, 30' or 30", or alternatively, can be provided with a central zig-zag retaining wall similar to wall 127.

Thus, the stepped-type organizers according to the present invention, when configured for use with compact disks, provide easy viewing of the compact disks, while permitting easy access to the compact disks therein. At the same time, the compact disk organizers have great balance and stability, even when only a few compact disks are held therein. The organizers are also relatively easy to mold from plastic material, so as to provide a relatively inexpensive organizer.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention defined by the appended claims.

What is claimed is:

1. A stepped-type organizer for holding rectangular parallelepiped articles having a length, a width and a depth, said organizer comprising:

a first L-shaped section including a first rigid plate having a first edge fixedly and permanently connected substantially at a right angle to a first edge of a second rigid plate at a first organizer support corner line;

a second L-shaped section including a third rigid plate having a first edge fixedly and permanently connected substantially at a right angle to a first edge of a fourth rigid plate at a second organizer support corner line;

an opposite second edge of said first plate being fixedly and permanently connected to an opposite second edge of said third plate at a raised third corner line, so as to provide a zig-zag configuration of said organizer in a side elevational view, with said organizer being supportable on a surface by said first and second organizer support corner lines, said first and second plates of said first L-shaped section defining a first pair of article receiving surfaces for receiving and supporting at least one rectangular parallelepiped article thereon, and said third and fourth plates of said second L-shaped section defining a second pair of article receiving surfaces for receiving and supporting at least one parallelepiped article thereon;

said first plate having a first length and said third plate having a second length less than the first length of said first plate; and said second and fourth plates having a length less than the second length of said third plate.

2. The organizer according to claim 1, wherein each of said first through fourth plates has a substantially rectangular configuration.

3. The organizer according to claim 1, wherein said first through fourth plates have equal widths.

4. The organizer according to claim 1, wherein said second and fourth plates have substantially equal lengths.

5. The organizer according to claim 1, wherein said first and third plates are connected at a substantially 90° angle.

6. The organizer according to claim 1, further comprising a first raised outboard retaining wall at one side of said organizer and connected with said first through fourth plates so as to extend above upper surfaces thereof, and a second raised outboard retaining wall at an opposite side of said organizer and connected with said first through fourth plates so as to extend above the upper surfaces thereof.

7. The organizer according to claim 6, further comprising a third raised retaining wall formed on an upper surface of said organizer between said first and second raised outboard retaining walls.

8. The organizer according to claim 1, further comprising a plurality of parallel, spaced apart shallow ribs formed on an upper surface of said organizer, to retain objects in standing relation between adjacent ones of said ribs.

9. The organizer according to claim 8, wherein said shallow ribs are formed on upper surfaces of all of said first through fourth plates.

10. The organizer according to claim 8, wherein said shallow ribs are spaced apart a distance to receive a cased compact disk between adjacent shallow ribs.

11. The organizer according to claim 10, wherein said adjacent ribs are spaced to receive said cased compact disk with a clearance.

12. The organizer according to claim 1, wherein said first and second L-shaped sections are made of a single, one-piece, molded structure.

* * * * *